(12) United States Patent
Wilson et al.

(10) Patent No.: US 11,474,373 B2
(45) Date of Patent: *Oct. 18, 2022

(54) EYEWEAR

(71) Applicants: Ken Wilson, Yuma, AZ (US); Rich Belitz, Yuma, AZ (US)

(72) Inventors: Ken Wilson, Yuma, AZ (US); Rich Belitz, Yuma, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/785,421

(22) Filed: Feb. 7, 2020

(65) Prior Publication Data

US 2020/0174280 A1    Jun. 4, 2020

Related U.S. Application Data

(63) Continuation-in-part of application No. 16/260,007, filed on Jan. 28, 2019, now Pat. No. 11,002,988.

(60) Provisional application No. 62/622,685, filed on Jan. 26, 2018.

(51) Int. Cl.
G02C 5/00 (2006.01)
G02C 5/14 (2006.01)

(52) U.S. Cl.
CPC .............. *G02C 5/008* (2013.01); *G02C 5/14* (2013.01); *G02C 2200/08* (2013.01)

(58) Field of Classification Search
CPC ... G02C 1/10; G02C 2200/08; G02C 2200/10
USPC .............................................. 351/83, 86, 154
See application file for complete search history.

(56) References Cited

U.S. PATENT DOCUMENTS

| | | | | |
|---|---|---|---|---|
| 3,899,840 A | * | 8/1975 | Maillet ................. | G02C 5/2254 351/113 |
| 4,427,271 A | * | 1/1984 | Fogg ........................ | G02C 1/06 351/154 |
| 7,722,188 B2 | * | 5/2010 | Mikame ............... | G02C 5/2254 351/153 |
| 8,517,532 B1 | * | 8/2013 | Hicks ..................... | G02C 5/229 351/153 |
| 2005/0286011 A1 | * | 12/2005 | Maling .................... | G02C 1/08 351/41 |
| 2008/0100793 A1 | * | 5/2008 | Wied ........................ | G02C 5/10 351/116 |
| 2008/0218683 A1 | * | 9/2008 | Lam ........................ | C08L 67/02 351/117 |
| 2010/0309426 A1 | * | 12/2010 | Howell .................. | G02C 5/146 351/158 |

* cited by examiner

*Primary Examiner* — Darryl J Collins
(74) *Attorney, Agent, or Firm* — Donn K. Harms

(57) ABSTRACT

A lens holding system for eyeglass frames having a pliable body with a lens opening for engagement of a lens therein and a circumferential edges configured to engage with a lens aperture of an eyewear frame to hold the lens operatively positioned therein. A front surface portion extending from the pliable body contacts a front surface of the eyeglass frame and is formed with a width narrower than a rear surface portion extending from the pliable body which contacts a rear facing surface of the eyewear frame. Significant comfort and performance enhancement is provided using a metal alloy frame in combination with polymeric temples.

12 Claims, 6 Drawing Sheets

SECTION A-A

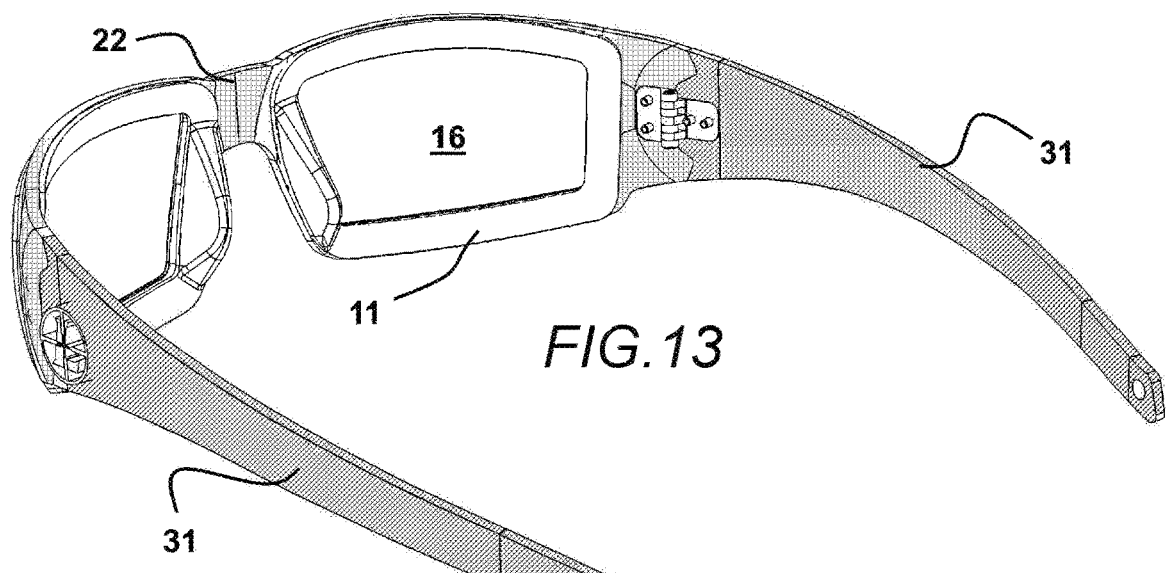
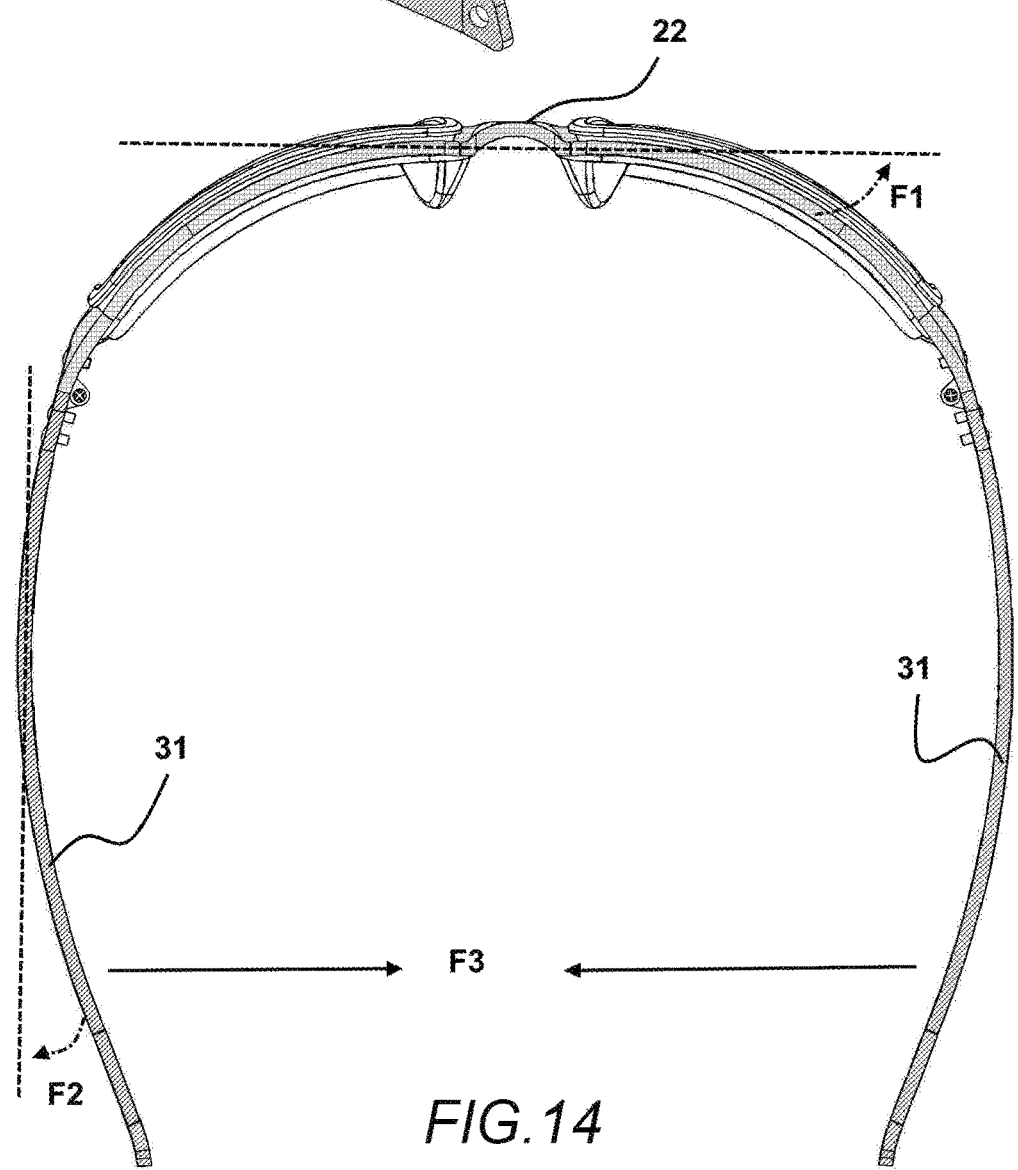

EYEWEAR

This application is a Continuation in Part Application to U.S. patent application Ser. No. 16/260,007 filed on Jan. 28, 2019 which claims priority to U.S. Provisional Patent Application Ser. No. 62/622,685 filed on Jan. 26, 2018, both of which are incorporated herein in their respective entirety by this reference thereto.

BACKGROUND

1. Field of the Invention

The invention relates to eyewear such as sunglasses and eyeglasses. More particularly, the disclosed device relates to a polymeric lens holder adapted to engage within the openings of a metal eyeglass frame on a first edge and to operatively hold a lens within an opening on a second edge, where the lens holder is formed with a front and rear facing portions having a ratio of width which enhances resistance to the held lens from dismounting.

2. Prior Art

Eyewear, such as sunglasses, have been employed throughout the world for decades for vision enhancement in bright sunlight as well as for protection for the eyes in bright environments. Due to operative requirements in blocking sunlight and glare at different times of the day, as well as for style choices, many users of sunglasses tend to own several pairs for such varying reasons. One issue with the owning of multiple pairs of sunglasses is the significant cost of purchasing and maintaining them. Another issue for users is the difficulty of managing and keeping sunglasses in an organized location. Sunglasses are used for lots of different activities such as golf, motorcycle riding day and night, bicycle riding, running, driving a car, combat, or in a more relaxing venue such as the beach. As a consequence, eyewear, such as sunglasses, require users to make different lens choices for different conditions of use, such as in lighting conditions where the lenses may differ for glare and time of day or when employed to protect the eyes from both glare and projectiles which might impact the eye, such as during bike or motorcycle riding or combat.

In recent years, there has been a growing new development in eyewear frames where not only plastic material is employed for eyewear and sunglasses, but metal frames are also used. An example of such is the development and marketing of metal frames by GATORZ such as the patented aluminum sunglass (U.S. Pat. No. 5,583,583 which is hereby incorporated by reference). Metal frame products, such as that by GATORZ, are conventionally formed from aluminum of specific rigidity to withstand frame and lens impact from extreme sports and where the user needs impact resistance due to their activity such as motorcycle or bike riding at high speeds, or in combat The success in the industry subsequent to the introduction of metal frames has caused such metal frames for eyewear to be introduced to the market by many firms. A significant issue for firms manufacturing such eyewear employing metal frames is that it is hard to mount the glass or plastic lenses within the openings provided for such in metal eyewear frames. Because such frames are formed of metal such as aluminum or titanium, which is tempered for hardness, and therefore do not stretch or bend in the manner of plastic frames, engaging lenses within the openings of the metallic frames is a significant issue. Where the metal forming the eyewear frames has a tempered hardness of for example 4,000 series and up to 7,000 series, the rigidity of the formed frame renders the problem of an easy but secure mount of lenses therein, elusive at best. Further, once mounted using a polymeric interface or lens holder which is sufficiently pliable to allow for lens engagement, the mounted lenses in many cases are subject to dismount upon impact by a projectile or where the temperature causes expansion of the metal frame without a matching expansion of the polymeric lens holder.

There have been other frame designs in the industry which use aluminum or titanium but only in a thin and less bulky configuration of the formed frame. For example, titanium frames made from rolled materials do not compare to frames that have been made from sheet or billet block aluminum. The aluminum requires a mass area of metal to retain its strength and integrity.

As such, there is a continuing unmet need for a lens engagement system which solves the conventional problems for the eyewear industry which occur where frames of metal such as aluminum for sunglasses are formed with thin small grooves that make it difficult to take lenses in and out of the sunglass frames. This is because metal frames, such as those from aluminum, are formed from 0.070 to 0.250 inch thick and a groove must be cut in the metal to accept the V or U shape lens bevel. Since most lenses are between 0.040 to 0.090 inch thick, such as sunglass lenses and nonprescription lenses, this leaves little area for lens engagement. The problem is exacerbated by prescription lenses, which can be much thicker in certain areas making them a challenge to even engage to a metal frame.

Many aluminum sunglasses on the market today are made from 6061, 7075, 5052 and other lower hardness alloys. Most manufacturers are forging, machining, or injecting these alloys to create the mass frame structure to withstand the abuse. One advantage to these frames, that they all have in common, is they are lightweight which is a benefit of using aluminum versus steel or other heavy metals. Further, steel or other heavy metals lack the flexibility such an alloy provides and especially in sheet or billet type production glasses.

Some manufacturers will make aluminum sunglasses from sheet such as 6061 or 7075 and machine them on a CNC. Some aluminum glasses are extruded like the LIQUID EYEWEAR patented product, but lens mounting issues remain a problem such as having a lens that will easily snap in and out but will not easily dismount upon impact to the lens during use which can cause injury to the user.

Other sunglasses on the market offer lens replacement by employing plastic frames and even provide videos depicting how easy it is to replace a lens in a plastic frame. Consequently, plastic frames are conventionally perceived as much easier for the user to deal with since plastic frames will flex much easier than metal frames formed of aluminum or titanium.

Conversely, most companies providing metallic frames such as formed from aluminum or titanium require the customer to return the eyeglasses to the factory for lens replacement. This is a significant issue where the user has a changed lens prescription or just wants replacement lenses due to lens damage. Because of the difficulty in removing old lenses and engaging replacement lenses in metal frames, some factories will dispose of the old eyewear frame and give the consumer a new frame with new lenses inserted, at significant cost in money to the factory and significant time delay for the user.

Many military servicemen and women, such as Navy Seals, prefer wearing metal frame eyewear such as aluminum sunglasses because they are lightweight and knowing the lens is surrounded by aluminum such as 7075 alloy which is used in jet fighter wings. The aluminum being both comfortable and lightweight makes them a preferred choice of eyewear. However, when a scratch occurs to the lenses or they need replacement for other reasons, they usually have to buy another pair or rely on a backup pair which the factory then re-engages new lenses since the user cannot do so. Where softer polymeric interfaces have been used in the past, which are sufficiently pliable to allow the user to disengage and re-engage new lenses to the metal frame, dismounting of the user-engaged lenses is an issue, especially upon an impact to the lenses.

The forgoing examples of related art as to the engagement of eyeglass lenses with eyeglass frames, especially metal frames, and limitations related therewith, are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF INVENTION

The device and method herein provides a solution to the shortcomings of conventional mounting of glass and plastic lenses within eyeglass lens openings in the thin material of eyeglass frames such as those made from metal such as aluminum or titanium. The hybrid mode of the device herein additionally provides the user with more comfort when wearing the eyewear, especially where the frame is in a configuration where it is too stiff and tends to cause a compressive engagement of the temples to the head of the user. Employing a polymeric lens holder that interfaces between the side edge of the eyewear lens and the interior edges of thin eyewear frames such as those made from metal, the device herein provides for the easy engagement of lenses within metal eyeglass frames. The inclusion of polymeric temples, in combination with metal frames formed in a thickness and metal material which in combination with the temples provides a symbiotic fit to the user which is more comfortable then either alone.

In addition to the provision of easy engagement and disengagement and replacement of lenses within eyeglass frames, such as those made from metal, the configuration of the lens holder herein, if formed in a configuration which significantly enhances resistance to lens dismounting from the frame, such as upon impact contacts with the lenses during use. Such impacts can be, for example, caused by a large insect when the user is riding a bike or motorcycle or by projectiles which might be encountered in combat or training therefor.

This ease of installation, but resistance to dismounting upon impact to the held lens, provides wearers of eyeglasses with the ability to change or replace their own lenses when required. Further, by employing a lens holder configuration which resists the force of impacts to the mounted lenses, the lens holder device herein significantly enhances the safety of the user of eyewear employing the lens holders herein, to prevent eye injury by preventing dismount of the lenses and contact to the eyes of the user of such dismounted lenses or the projectile that dismounted them.

The lens holder herein shown and described, provides this enhanced resistance to dismounting by forming a front surface portion facing the area in front of the eyeglass frame, which is smaller in width than the width of a rear surface portion on the opposite side of the frame which is adjacent the face of the user. It was found during experimentation that by forming the front surface portion in this shorter width, that upon impact with the lens held by the lens holder, the front surface portion folds forward and also stretches, and then snaps back to an original position. The shorter or narrower width of the front surface portion worked to increase dismount resistance in a range where the width $W1$ of the front surface portion was between 20 to 90 percent of the width $W2$ of the rear surface portion. While this range provided an enhanced resistance to dismounting of the held lens, a range of the width $W1$ of 30-80 percent of the width $W2$ worked somewhat better and a range of $W1$ of 40 to 70 percent of the width of $W2$ of the rear surface portion performed best and should be employed where the eyewear is likely to encounter higher speed projectiles.

It should be noted that forming the width of the front surface portion narrower than that of the rear surface portion yielded an unexpected outcome, since originally it was thought that forming the front surface portion in a width equal to or wider than the width of the rear surface portion would enhance the stability of the held lens and resistance to dismount on impact. However, forming the front surface portion in this equal or larger width configuration than that of the rear surface portion unexpectedly caused the lenses to more easily dismount on contact with projectiles hitting the lens. In further experimentation, it was found that the equal or larger width of the front surface portion caused the force of the impact to be communicated to the front surface portion at full force without the stretching and momentary curling of the front surface portion occurring, resulting in the lens dismounting from the lens holder and frame. Counterintuitively, employing the narrower width configuration of the front surface portion was found to form a shock absorber during impacts to the lens, such as a curling forward of the front surface portion and slight stretching and movement of the lens holder within the frame aperture, and retainment of the lens in the holder and frame.

Additionally found to affect the shock absorbing ability of the polymeric lens holders in the configuration with a narrower width front surface portion is the durometer of the polymeric material forming the lens holder on the D-scale range. Where the material has a shore durometer which is was too soft, the shock absorption occurred, but in some cases the lens holder overstretched and did not prevent lens dismount on impact as well as that of harder durometer ranges. However, harder shore rating and durometer ranges made it harder to mount and dismount the lenses in the frame.

In experimentation it was found that a D-scale durometer of 40 shore was as soft as might be acceptable to pass the ANSI-Z87.1-2015 testing. An increase to a durometer of 63 shore provided much more resistance against lens dismount using the narrower front surface portion as did a durometer of 70 shore and then to 90 shore. However, while the material in the higher durometer range worked well it as noted, made it harder for a user to mount and dismount lenses.

As such, when forming the lens holder of a pliable polymeric material such as TPEE which worked well especially during wide temperature variances, the preferred durometer of the material would be in a range on the D-scale between 40-90 shore. This range allowed for reasonably easy engagement and disengagement of surrounded lenses to the frame and provided the enhanced resistance to projectile-caused dismounting where the lens holder is formed with the front surface portion having a narrower with than that of the rear surface portion. Where the eyewear is going to be used with the possibility of high speed projectile impact such as riding on a motorcycle or in combat or training, a D-scale durometer between 60-70 shore was found to enhance dismounting resistance and allowing for easy user changing of lenses. This range also allowed the front surface portion to deform and act as a shock absorber to impact force of projectiles against the lens and prevent a lens dismount.

In all modes of the device herein, the lense holder will have an exterior edge in between the front surface portion and the rear surface portion of the lens holder, which forms an exterior circumferential edge adapted to engage the interior circumference of a lens opening in an eyewear frame such as metallic frames. This exterior circumferential edge can simply be the surface of the lens holder located in a gap between the front surface portion and the rear surface portion or it may also have a recess formed into the surface of the material within the gap for a more secure engagement to the lens opening in the frame if required. On an opposite interior circumferential edge, a groove is formed therein which is adapted to engage with a lens circumference on the exterior edge of the lens to be mounted.

In extensive testing, it was also found that with the frame holding the lenses is formed of metal, that a compressive contact of the temples extending from the metal frame could be a significant cause of user discomfort, and in some cases headaches. During experimentation it was found that the discomfort and headaches were apparently caused when the metal frame, be it curved as shown, or planar, when formed in a thickness and/or of a metal alloy material, can lack sufficient flexibility to flex slightly when worn, to accommodate many facial structures of users. For example users with a larger or wider head, were found to have a force of contact of the temples extending from opposite ends of the metal eyeglass frame, which biased the temples under force against the sides of their head. While this may seem like a product attribute which enhances the engagement to the head of the user to prevent accidental dismount, in fact an excessive compressive inward contact of the temples, caused headaches in some and skin irritation in others.

In order to render the device more easily accommodating to a wider number of users with varying head sizes, significant experimentation was conducted to find a solution which couples a metal frame having the above noted benefits when employed with the lens body holders herein, with polymeric temples. The combination of a frame formed of a metal having a hardness and shear strength when in a thin sheet, to prevent dismounting of the lens holder body during flexing, but a modulus of elasticity to allow for slight flex during use, with polymeric temples providing for flex and light weight, combine to provide a symbiotic relation of the above positive attributes yielding the most comfortable fit for the widest variety of users with all sizes of heads and eye spacing. This is most important when the eyewear is being used by individual users, but especially important where the eyewear is used with groups such as the military, to customize the lenses held in the lens openings of the frame by the flexible lense body, and still provide a comfortable fit for short and long term use in challenging weather and temperatures and field conditions.

There are literally hundreds of aluminum metal alloys in a high number of tempered hardness and extensive testing of such was required to find the most preferred metal alloy which provided a frame useable with users having widely varying head characteristics. It was important to find the most comfortable frame which would hold up to the rigors of use in sports, and especially in combat, where the eyewear can be customized for each user as to the optic correction, while still providing an impact resistant and comfortable frame.

After many combinations of metal allow frames and differing polymeric temples, where failure of lens mounting occurred with some, and discomfort to users occurred with many others, a most preferred solution was found. By forming the metal frame in a narrow range of thickness, of a metal allow material with sufficient elasticity, elongation percent, and shear strength, to allow deformation without fracture or a dismount of the lenses, in a combination with polymeric temples having a determined Tensile E modulus and flexure during use, that the two components combined in a symbiotic manner, yield the most comfortable fit to the widest number of users of differing head sizes and eye spacing.

Currently formation of the metal frame in thickness in a range substantially between 0.075 to 0.085 inches, of a metal alloy of 6061 aluminum with a T6 hardness is the most preferred alloy. While the 6061 aluminum with a T5 will work, a T4 hardness was found too soft for structural longevity, and liable to crack or fail and cause lens dismount. Also the metal frame maintained structural integrity in a hardness of T7-T9, but with each increase in tempered hardness, discomfort tended to increase as the potential for cracking around the lens apertures in the frame. A 7075 aluminum alloy tempered to a T6 hardness was also found to provide for the flexure and deformation during use to comfortably accommodate both small and large heads. As such, a metal alloy in a thickness between 0.060 to 0.25 inches, formed of a 6061 Aluminum alloy, or a 7075 aluminum alloy, with a tempered hardness between T4-T9 is preferred for the metal frame, with a tempered hardness of T6 being the most preferred. The best overall result was provided by the metal and allow frame in a thickness between 0.075 to 0.090 inches with 0.080 inches in thickness yielding particularly preferred comfort in combination with the polymeric temples while still yielding good impact resistance and resistance to dismounting of lenses during hard use such as sports or combat under both freezing temperatures as well as desert temperatures.

The temples were likewise tested in many types of material from nylon to polyester to other polymeric materials having differing ranges of thickness of the temples themselves. Tested materials included zylonite, acetate and cellulose acetate, polyamide, nylon, and polycarbonate. Of the many materials tested, TR90 GRILAMID nylon having a Tensile E modulus of 1600 Mpa, or an equal substitute in this modulus, in combination with the metal allow frames in the above noted materials and construction, yielded the most comfortable eyewear which stayed on the heads of users. The temples formed in this material had a length of between three to six inches extending from the hinged engagement to the allow frame. The best performing thickness of the formed temples of the nylon material were between 0.090 to 0.190 inches in thickness.

With respect to the above description, before explaining at least one preferred embodiment of the herein disclosed shock absorbing user employable lens holder in detail, it is to be understood that the disclosed lens holder herein is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed lens holder. It is important, therefore, that the claims be regarded as including such equivalent construction and methodology insofar as they do not depart from the spirit and scope of the present invention.

The objects, features, and advantages of the present user employable shock absorbing lens holder invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF THE DRAWINGS

The accompanying drawings, which are incorporated herein and form a part of the specification, illustrate some, but not the only or exclusive, examples of embodiments and/or features of the lens holder invention herein. It is intended that the embodiments and figures disclosed herein are to be considered in all cases illustrative, rather than limiting.

In the drawings:

FIG. 1A depicts the device as in FIG. 1, showing the preferred width W1 of the front surface portion which contacts the lens frame on the surface opposite that which faces the wearer.

FIG. 13 shows a mode of the metal frame and polymeric temples employable with the components and configurations of the device in FIGS. 1-12, but with the polymeric temples engaged to a metal alloy frame, both of which have a calculated flexure, and hardness to yield a more comfortable and secure fit on the multiple dimensions of the heads of users.

FIG. 14 shows a top view of the temples operatively engaged with the metal frame of the metal alloy with both having a hardness and elasticity modulus and flexure which combine in a symbiotic combination allowing for the most comfortable secure fit, impact resistance, while preventing dismount of the lenses from the frame.

Other aspects of the disclosed lens holder device herein will be more readily understood when considered in conjunction with the accompanying drawings, and the following detailed description, neither of which should be considered limiting.

DETAILED DESCRIPTION OF EMBODIMENTS

Figure 12:
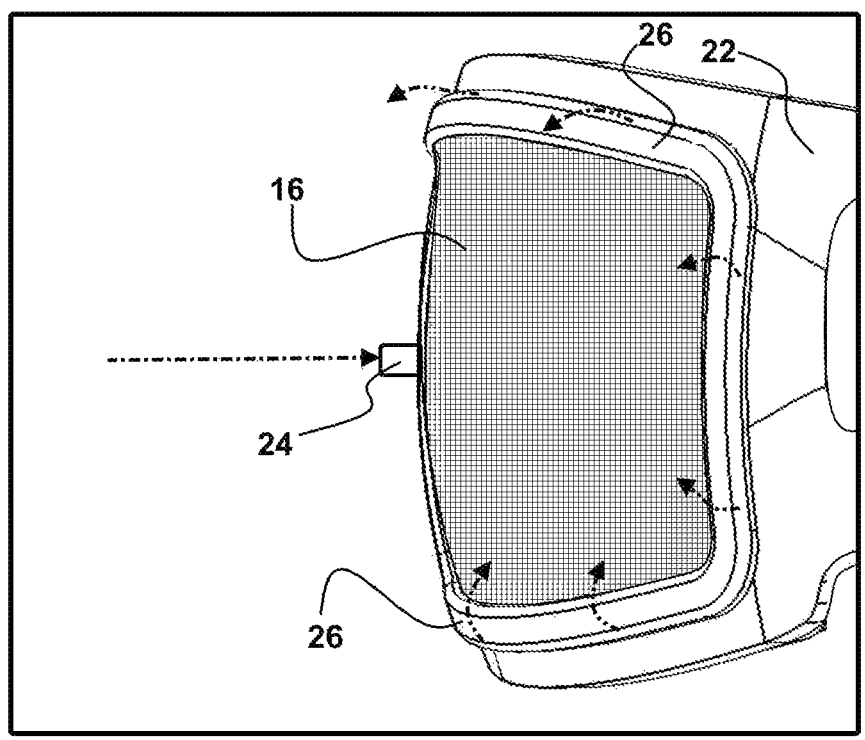
FIG. 12 depicts the unexpected finding of increased resistance to impacts to the lens which prevents dismounting of the lens from the frame, where the front surface portion undergoes a deformation from the force of an impact and stretches and/or may curl slightly away from the frame in a shock absorbing deformation absorbing some of the force of the impact and preventing lens dismounting from the lens holder device and frame.

This device 10 herein has a lens body 11 formed of elastic material which is adapted within a lens holding opening 12 to circumferentially engage around the exterior circumference 14 of a lens 16, to operatively hold the lens 16, within a formed lens opening 12 within the body 11 of the device 10. The body 11 of the lens mounting device 10 is configured with a circumferential edge 18 opposite the surface of the opening 12 for the lens 16, to engage with a lens aperture 20 formed in an eyeglass frame 22 such as a thin metal frame. So configured, the device 10 allows users of metal sunglass frames the ability to easily change their lenses 16 without having to return them to the factory, while providing them the confidence that the lens 16 engaged with the lens mounting device 10 herein, will not easily dismount when struck by a projectile 24 such as shown in FIG. 12.

Figure 1:
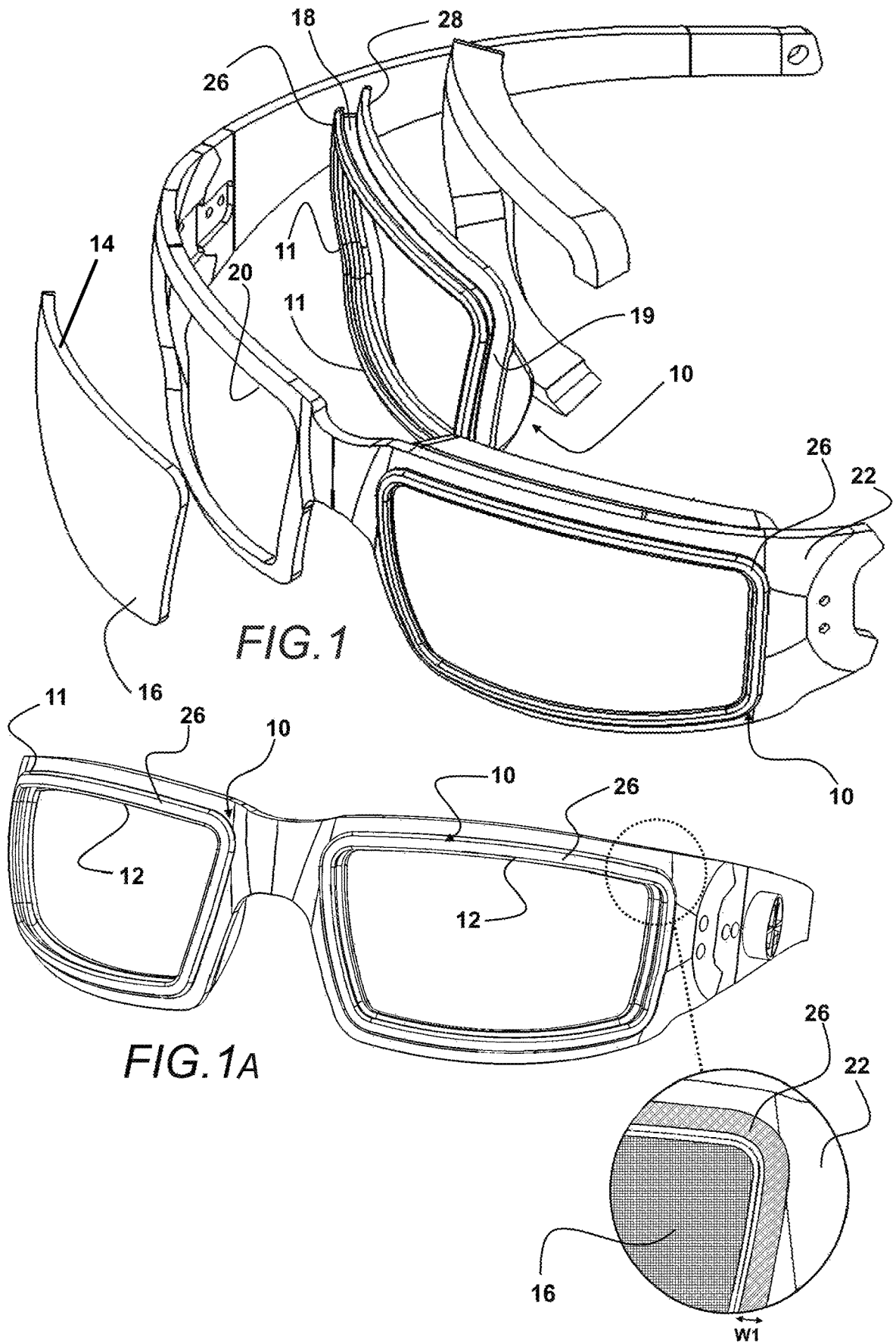
FIG. 1 shows an exploded view of a pair of sunglasses having a sunglasses frame; a lens holder configured to nest within a first aperture associated with the sunglasses frame; and a lens configured for insertion within a second aperture associated with the lens holder. The lens, lens holder, and frame combine to form the sunglasses. In this regard, the lens can be easily changed, and the lens holder can be changed to optionally accommodate style changes. Also optional is foam attached at a rear side of the lens holder configured to touch the body of a wearer.

Shown in FIG. 1, is an exploded view of eyewear such as sunglasses having a sunglasses frame 22 to which the lens holder device 10 interfaces between a lens 16 and the lens apertures 20 of the frame 22. As shown, the body 11 of the device 10 is configured to nest within either lens aperture 20 associated with the eyewear frame 22. The body 11 of the device 10 is configured on a surrounding side edge of the lens opening 12 to operatively engage with and around the exterior circumference 18 of a lens 16 to be mounted in the lens aperture 20 of the frame 22.

As can be seen in FIGS. 1 and 1A, a front surface portion 26 extends to a distal edge thereof from a first end engaged with the body 11 of the device 10. This front surface portion 26 is positioned across a gap from the rear surface portions 28 which projects from the body 11 a width distance to a distal edge of the rear surface portion 28. This circumferential edge 18 of the body 11 is positioned within the gap which has a width defined by the distance between the front surface portion 26 and rear surface portion 28.

Figure 11:
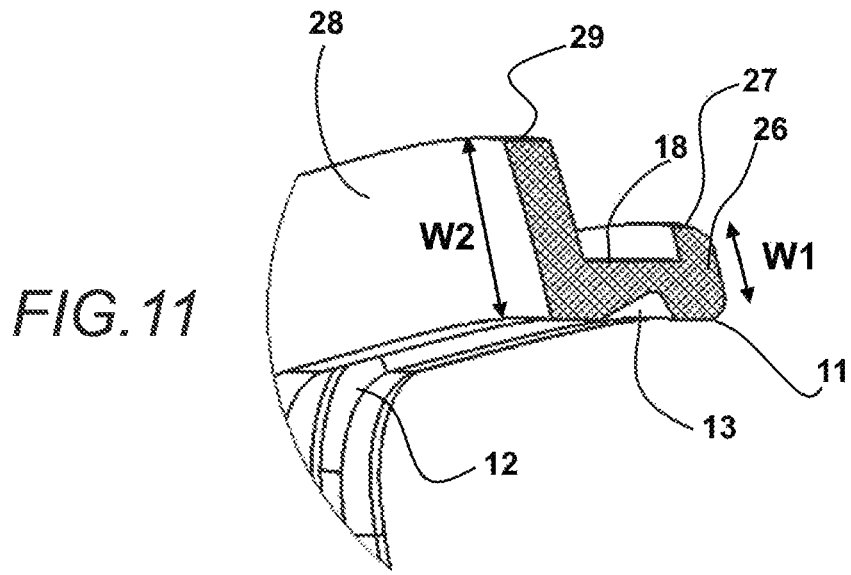
FIG. 11 shows the lens holder device having a body having a frame channel formed in the gap between the wider W2 rear surface portion and the narrower W1 front surface portion and showing a recess formed into the circumference of the lens engagement opening adapted to hold the circumferential edge of a lens therein.

As noted, in all modes of the device 10 herein, and as shown in FIGS. 1, 1A, and FIG. 11, the width W1 of the front surface portion 26 from the first end thereof engaged to the body 11 to the distal edge of the front surface portion 26, is shorter than a width W2 of the rear surface portion 28 which is positioned across a gap defined by the circumferential edge 18 of the body 11, and extends from the body 11 to the distal edge of the rear surface portion 28.

In all modes of the device 10 herein, the width W1 of the front surface portion 26 worked to allow the required deformation and thereby increase shock absorption from projectiles 24 (FIG. 12) where the width W1 of the front surface portion 26 was in a first ratio, where W1 is between 20 to 90 percent of the width W2 of the rear surface portion 28. Consequently, eyewear frames 22 using the device 10 herein where the widths are in this range all yield an enhanced resistance to lens 16 dismount.

While this first range provided an enhanced resistance to dismounting of the held lens 16 as noted, a second range of the width W1 of 30-80 percent of the width W2, provided a more enhanced resistance to lens 16 dismount, and third range of W1 being 40 to 70 percent of the width of W2 of the rear surface portion 28, provided a maximum resistance to lens dismount, and would be employed where the eyewear is likely to encounter higher speed projectiles 24 (FIG. 12). However, employment of a lens mount device 10 having a body 11 with front surface portion 26 with a width W1 being narrower or smaller than a width W2 of a rear surface portion 28, in all ranges noted above, did yield an enhancement of resistance to lens 16 dismount from a configuration where the widths were equal or where the width W1 was larger than the width W2 of the rear surface portion 28. Consequently, in all modes of the device 10 herein, it is preferred that the width W1 of the front surface portion 26 is exceeded by a width W2 of a rear surface portion 28, in order to achieve the above noted shock absorption and dismount resistance.

Further, all modes of the device 10 herein, as noted, can enhance this shock absorption provided by the smaller front surface portion width W1, by employment of an elastic material to form the body 11, such as TPEE with a durometer in a range on the D-scale between 40-90 shore. This range allowed for reasonably easy engagement and disengagement of surrounded lenses 16 to the frame 22 and provided the enhanced resistance to projectile-caused dismounting where the body 11 of the lens holder device 10 is formed with the width W1 of the front surface portion 26 being narrower with than that of the width W2 of the rear surface portion 28. Where the eyewear is going to be used with the possibility of high speed projectile impact such as riding on a motorcycle or in combat or training, a D-scale durometer between 60-70 shore was found to enhance the lens 16 dismounting resistance provided by the device 10 and still allow for easy user changing of lenses. Consequently, this durometer shore range can be employed where the eyewear is to be used in areas with higher speed projectiles. Where the eyewear frame 22 is formed of metal such as from a group including aluminum and titanium, the device 10 herein works especially well the prevent lens 16 dismount by allowing for the deformation of the front surface portion 26 as noted herein.

Figure 2:
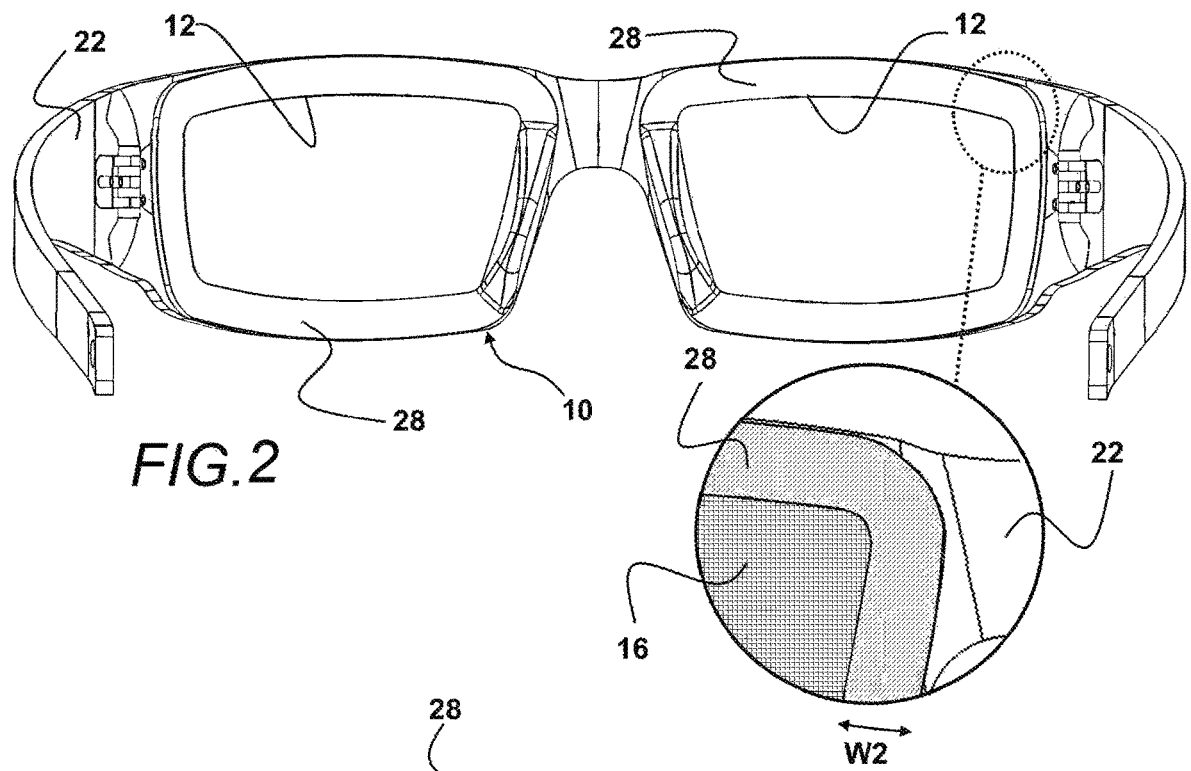
FIG. 2 shows a rear view of the device of FIG. 1 assembled, and depicts an enlarged view of the rear surface portion which contacts the frame on an opposite side from that of the front surface portion shown in FIG. 1A.

Shown in FIG. 2, is a rear view of the device 10 herein shown in FIG. 1, but assembled. As depicted, there is shown an enlarged view of the rear surface portion 28 which contacts the frame 22 on an opposite side thereof from that of the front surface portion 26 shown in FIG. 1A.

Figure 2A:
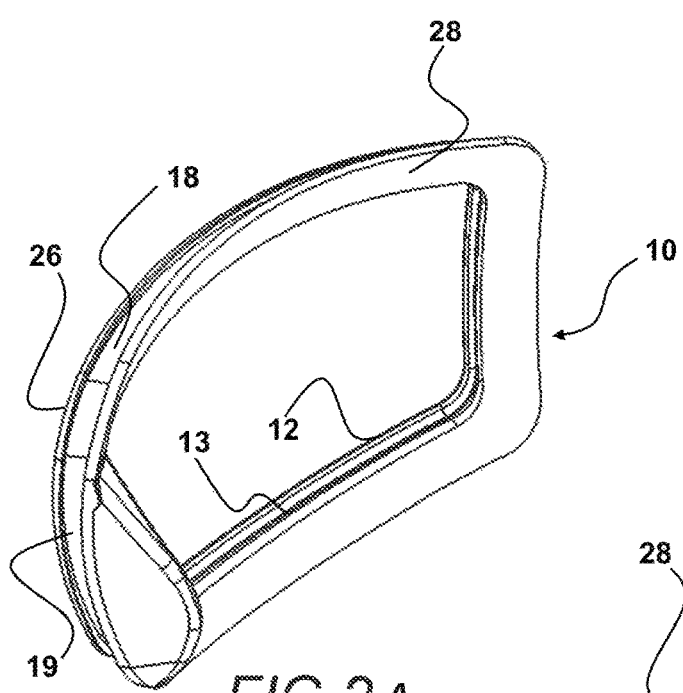
FIG. 2A shows a rear side of the lens holder device herein also showing a bridge or nose pad optionally formed as part of the lens holder body.

A single device 10, is shown in FIG. 2A ready for engagement around a lens 16 which will contact and operatively engage with the surface of the lens opening 12. A recess 13 may be formed into the surface defining the circumference of the lens opening 12 to engage around the circumferential edge 18 of a lens 20.

Figure 3:
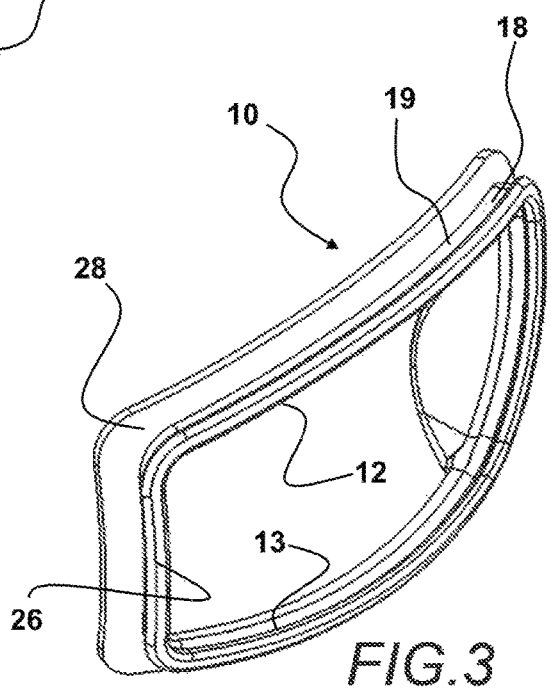
FIG. 3 shows a front side of the lens holder device herein in a front perspective view and showing a exterior circumferential surface formed around the lens holder device in a gap formed between the front surface portion and rear surface portion.
Figure 4:
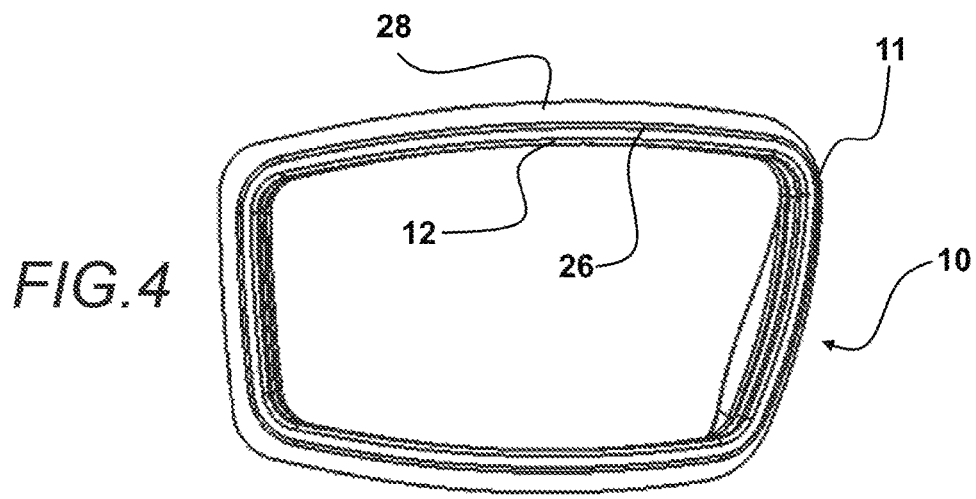
FIG. 4 shows a front side of the lens holder device herein, showing the front surface portion projecting from the lens holder body in a direction away from the lens opening surrounded by the lens holder body.
Figures 5, 6, 7:
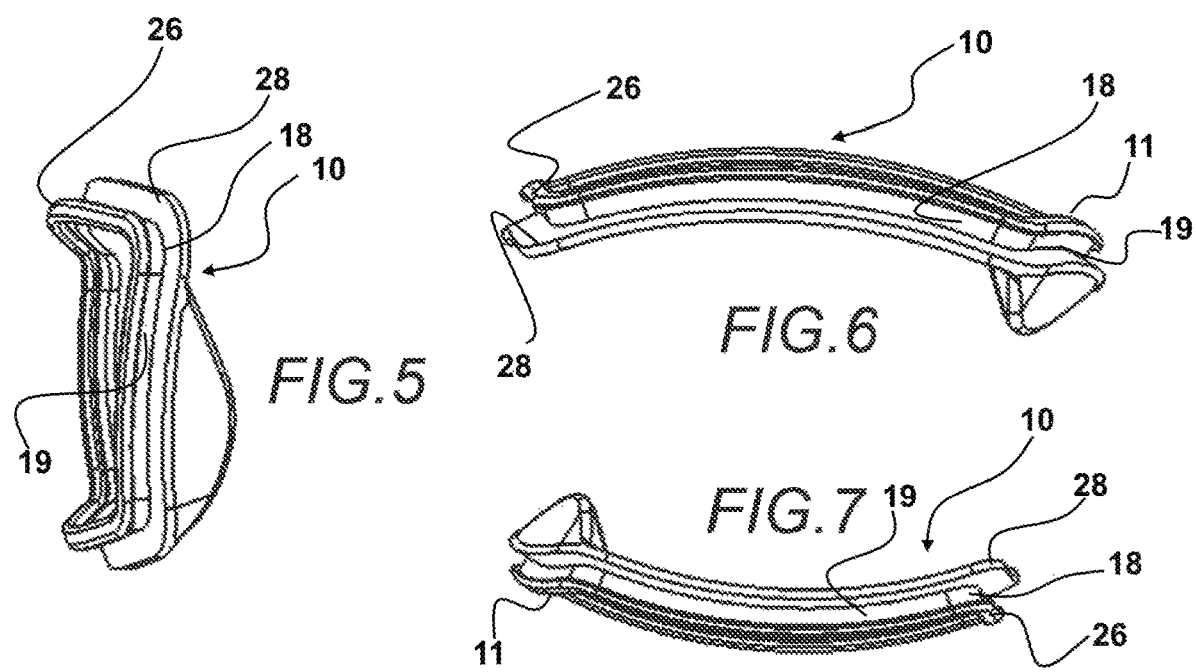
FIG. 5 shows an end view of the lens holder device herein showing the front surface portion projecting to a distal end across the gap from the rear surface portion projecting to a respective distal end thereof.
FIGS. 6 and 7 show top and bottom views of the lens holder device herein.
Figure 8:
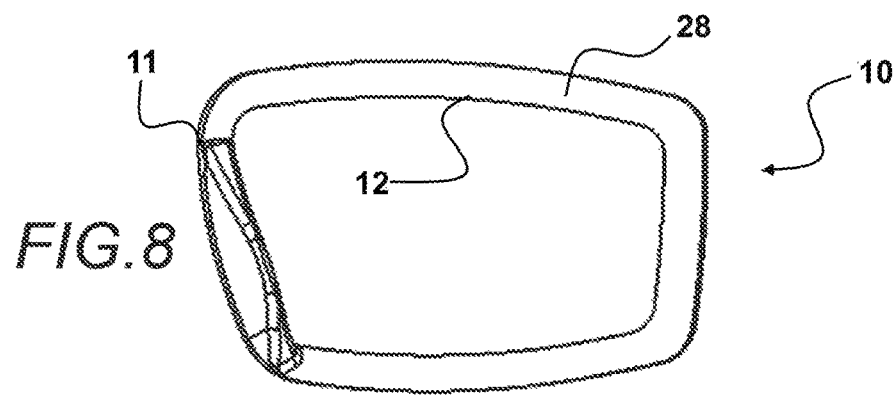
FIG. 8 shows a rear plan view of the lens holder device herein showing the rear surface portion projecting to a distal end thereof and the lens opening formed within the body of the lens holder device.

Shown in FIG. 3 shows a front side of the lens holder device 10 herein in a front perspective view opposite the view of FIG. 2A. As can be seen, the exterior circumferential surface 12 formed around the exterior of the body 11 of the lens holder device 10 is positioned in a gap 19 formed between the front surface portion 26 and the rear surface portion 28. The width of this gap 19 may be adjusted to match the width of the frame 22 to which the body 11 of the device 11 engages to hold a lens 16 in place.

FIG. 4 through FIG. 8 depict various views of the lens holder device 10 herein disclosed. As shown, the body 11 forming the device 10 in all modes has a rear surface portion 28 with a width W2 exceeding that of the front surface portion 26. A circumferential edge 18 of the body 11 is positioned within a gap 19 between the front surface portion 26 and rear surface portion 28, and is sized to contact against the surface defining the lens aperture 20 in an eyeglass frame 22. As noted, this formation allows the front surface portion 26 to undergo a deformation to absorb force of an impact of a projectile 24 (FIG. 12). By deformation is meant that the front surface portion 26 stretches, flexes, or curls away from contact with the eyeglass frame 16 at is perimeter edge, as shown in FIG. 12. Such a deformation occurs upon an impact to the lens 16 by a projectile 24 and thereby defines a shock absorber which dissipates the force preventing it from dismounting the lens 16 from the lens opening 12 and any recess 13 therein.

Figure 9:
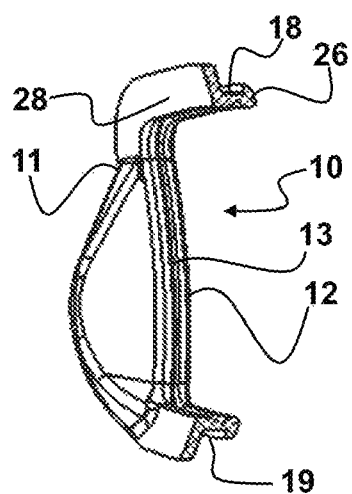
FIG. 9 shows a sectional view of the body of the lens holder device herein showing the rear surface portion projecting to a distal end thereof across the gap from the front surface portion.
Figure 10:
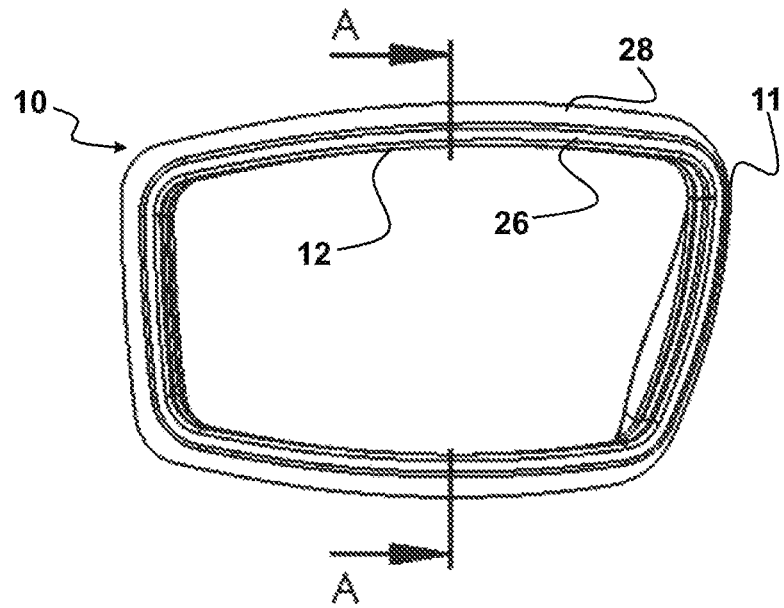
FIG. 10 shows a front view of the lens holder device depicting the path from which the cross section of FIG. 9 was taken.

Additional views of the device 10 are shown in the sectional and other views shown in FIGS. 9-11. As depicted for clarity of understanding, the body 11 of the lens holding device 10 shown in FIG. 10 is shown in sectional views in FIGS. 9 and 11.

In FIG. 9 can be seen the width of the rear surface portion 28 being significantly wider than that of the front surface portion 26. Also shown are the circumferential edge 18 around the body 11 within the gap 19 between the front surface portion 26 and rear surface portion 28. Additionally shown in FIG. 11 in an enlarged view of a portion of the sectional view of FIG. 9 is the width W2 of the rear surface portion being larger than the width W1 of the front surface portion, and an enlarged view of the circumferential edge 18 of the body 11 of the device 10, positioned in the gap 19 formed between the front surface portion 26 and rear surface portion 28.

As also can be seen, the front surface portion 26 projects from a first end engaged to and formed in a unitary structure with the body 11 of the device 10, to a distal edge 27 the defined width W1. Further shown is the rear surface portion 28 projecting from a first end engaged to and formed as a unitary structure with the body 11 of the device, to a distal edge 29 thereof for the width W2. Further shown for clarity is a portion of the lens opening 12 defined within the body 11 and the recess 13 which may be formed therein to aid in holding the lens 16.

Shown in FIG. 12, is a depiction of the deformation of the front surface portion 26 which dissipates the force from the shock absorber defined by forming the width W1 of the front surface portion 26, smaller or less than a width W2 of the rear surface portion 28 of the body 11 of the device 10. While counterintuitive as noted, it was found that the lens 16 was held better from dismounting from the lens opening 12 of the device 10, where this front surface portion 26 width W1 was shorter or narrower than that of the rear surface portion W2. This is because upon impact of a projectile 24 with the lens 16, the force communicated to the lens 16 is first communicated from the lens 16 to the body 11 of the device 10 and then to the circumferential edge 18. The formation of the shorter width W1 of the first projecting portion 26 allows for a deformation of the first projecting portion 26 to dissipate the force of the impact. By deformation is meant one or a combination of stretching of the material forming the projecting portion 26 or a curling or movement of perimeter portions of the projecting portion 26, away from the frame 22. Upon dissipation of some or all of the force of the impact by such a deformation, the projecting portion 26 moves back in position in contact against the frame 22 surface.

This deformation by the stretching and curling of the front surface portion 26, dissipates sufficient force from the impact of the projectile 24 with the lens 16, to maintain the lens within the lens opening 12, and preventing dismount therefrom which occurred when the front surface portion 26 was substantially equal to or larger in width W1 than the rear surface portion W2. Consequently, in all modes of the device 10 herein, this configuration and ratio of the width W1 being smaller than the width W2 is preferred.

Shown in FIG. 13 is a mode of the device 10 formed of a metal allow frame 22 in combination with polymeric temples 31 which have respective individual characteristics which combine on the formed device 10 to yield the most comfortable eyewear frame 22 on the widest number of users having differing head sizes.

As shown, the metal frame 22 formed of the alloy and in the thicknesses noted above, is used with any of the lenses 16 and lens bodies 11 and other components and configurations of the device in FIGS. 1-12. However, as noted above, after extensive testing of differing materials for both the temples 31 and the alloy frame 22, a preferred combination of a metal frame 22 formed of the metal alloy noted above, with the polymeric material in the temples 31 noted above, solved the discomfort problems associated with the device 10 when used with users with varying sized heads and eye separation.

Shown in FIG. 14, the frame 22 is formed in the even thickness range noted above from the first end to the second end of the frame 22. Formed in the thickness of an aluminum alloy material 6061 or 7075, with a tempered hardness in a range between T4-T9 the frame will flex F1 during use slightly while still maintaining a hold on the lenses 16. The temples 31 are operatively engaged with the metal frame 22 with a hinge. As noted it is important for the best and most comfortable fit yielding the impact resistance and stability of lens mount, to have the metal allow with a hardness and elasticity modulus and flexure F1 noted above, in combination with the temple 31 formed of the polymeric material having flexure F2 of the material noted above, to yield a combination of metal frame with polymeric temples having the most comfortable secure fit for a wide variety of user head sizes, as well as maintaining the increased impact resistance provided by the lens body 11 holding the lens 16 within a lens aperture 20. The combination or product of the force and flex of F1 with F2 yields a biasing force F3 of the inside of the temples 31 against the sides of the face of the user which has been found to be significantly enhanced for comfort. As such, the above noted alloy materials for the frame 22 in combination with the specific temples 31 formed of the above noted material in the above noted thickness range and length, is preferred as the combination was shown during extensive testing to yield the best results for comfortable secure eyewear for the broadest number of users with differing head dimensions.

While all of the fundamental characteristics and features of the disclosed lens mounting device herein have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. An eyewear frame comprising:
a metal eyeglass frame;
said eyeglass frame, said eyeglass frame extending between a first end and second end and having a first lens aperture and having a second lens aperture;
each of said first lens aperture and said second lens aperture having a lens holder in a respective engagement therein;
each said lens holder having a body having a lens opening defined by an interior circumferential surface thereof, said interior circumferential surface of said lens opening engageable with an exterior circumference of a lens;
a first temple in a first pivoting engagement with said first end of said eyeglass frame;
a second temple in a second pivoting engagement with said second end of said eyeglass frame;
each said body having a front surface portion having a first contact surface area defined by a surface area of said front surface portion extending in a first direction away from said lens opening for a first width from a first end of said front surface portion to a distal edge of said front surface portion;
each said body having a rear surface portion, said rear surface portion having a second contact surface area defined by a surface area of said rear surface portion extending in said first direction for a second width from a first end of said rear surface portion to a distal edge of said rear surface portion;
each said body having a circumferential edge positioned in a gap between said front surface portion and said rear surface portion, said circumferential edge for forming a respective said engagement with said first lens aperture and with said second lens aperture;
each said body in said respective engagement with said first lens aperture and said second lens aperture positioning said first contact surface area of said front surface portion in a first contact against a front surface of said eyeglass frame;

each said body in said respective engagement with said first lens aperture and said second lens aperture positioning said second contact surface area of said rear surface portion in a second contact against a rear surface of said eyeglass frame;

said rear surface of said eyeglass frame being positionable adjacent the face and eyes of a wearer of said eyeglass frame;

said front surface of said eyeglass frame being opposite said rear surface;

said second contact surface area being larger than said first contact surface area; and whereby said first contact surface is deformable in said first contact thereof against said front surface upon a force of an impact of an object upon said lens, thereby providing shock absorption for a portion of said force for preventing a disengagement of said lens positioned within said lens opening.

2. The eyewear frame of claim 1 additionally comprising:
said temples formed of polymeric material;
said metal of said eyeglass frame having a tempered hardness between T4-T9; and
said tempered hardness limiting a deformation of said eyeglass frame between said first end and said second end thereof, whereby said eyeglass frame will deform during use without a fracture thereof or a dismount of a said lens therefrom.

3. The eyewear frame of claim 2 additionally comprising:
said first width of said front surface portion being between 20 to 90 percent of the second width of said rear surface portion.

4. The eyewear frame of claim 2 additionally comprising:
said first width of said front surface portion being between 30 to 80 percent of the second width of said rear surface portion.

5. The lens holder for eyeglass frames of claim 2 wherein said eyeglass frame is formed of metal from a group including aluminum and titanium.

6. The lens holder for eyeglass frames of claim 2 wherein said eyeglass frame is formed of metal from a group including aluminum and titanium.

7. The eyewear frame of claim 1 additionally comprising:
said first width of said front surface portion being between 20 to 90 percent of the second width of said rear surface portion.

8. The lens holder for eyeglass frames of claim 7 wherein said eyeglass frame is formed of metal from a group including aluminum and titanium.

9. The eyewear frame of claim 1 additionally comprising:
said first width of said front surface portion being between 30 to 80 percent of the second width of said rear surface portion.

10. The lens holder for eyeglass frames of claim 9 wherein said eyeglass frame is formed of metal from a group including aluminum and titanium.

11. The lens holder for eyeglass frames of claim 1 wherein said eyeglass frame is formed of metal from a group including aluminum and titanium.

12. The lens holder for eyeglass frames of claim 1 wherein said eyeglass frame is formed of metal from a group including aluminum and titanium.

* * * * *